(12) United States Patent
Chen et al.

(10) Patent No.: US 9,862,276 B2
(45) Date of Patent: Jan. 9, 2018

(54) FAULT PROTECTION FOR ELECTRIC DRIVE SYSTEMS

(71) Applicant: Ford Global Technologies, LLC, Dearborn, MI (US)

(72) Inventors: Lihua Chen, Northville, MI (US); Yan Zhou, Canton, MI (US); Shuitao Yang, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/159,051

(22) Filed: May 19, 2016

(65) Prior Publication Data
US 2017/0334294 A1    Nov. 23, 2017

(51) Int. Cl.
*H02P 1/00* (2006.01)
*H02H 7/09* (2006.01)
*B60L 3/00* (2006.01)
*H02P 27/08* (2006.01)
*H02P 29/028* (2016.01)
*H02M 7/5387* (2007.01)

(52) U.S. Cl.
CPC ........... *B60L 3/0061* (2013.01); *H02P 27/08* (2013.01); *H02P 29/028* (2013.01); *H02M 7/53875* (2013.01)

(58) Field of Classification Search
None
See application file for complete search history.

(56) References Cited

U.S. PATENT DOCUMENTS

| | | | |
|---|---|---|---|
| 4,472,671 A * | 9/1984 | Shapiro | H02P 1/28 318/801 |
| 7,652,858 B2 | 1/2010 | Tang et al. | |
| 8,107,267 B2 | 1/2012 | Tallam et al. | |
| 8,810,177 B2 | 8/2014 | Schulz | |
| 2014/0070742 A1* | 3/2014 | Schulz | H02M 7/53875 318/400.22 |
| 2015/0002065 A1* | 1/2015 | Boscolo | H02P 6/182 318/400.35 |

* cited by examiner

*Primary Examiner* — Bentsu Ro
*Assistant Examiner* — Zemenay Truneh
(74) *Attorney, Agent, or Firm* — David B. Kelley; Brooks Kushman P.C.

(57) ABSTRACT

A vehicle power system includes a controller configured to issue commands to open a selected set of switches of an inverter and then to operate the selected set of switches according to a pulse width modulation signal having an increasing duty cycle such that input current to a battery is driven towards zero and a magnitude of d-axis current of the drive system is reduced in response to a fault with an electric drive system.

16 Claims, 3 Drawing Sheets

FAULT PROTECTION FOR ELECTRIC DRIVE SYSTEMS

TECHNICAL FIELD

The present invention relates to fault protection for permanent magnet electric machines.

BACKGROUND

Permanent magnet electric machine rotors may be driven by a rotating electromagnetic field induced by alternating current flowing through stator coil windings. Alternating current may be supplied by an inverter connected to a direct current source. Inappropriate protection strategies responding to a fault in the electric drive system may result in demagnetization of permanent magnets, exceeding electrical ratings of the inverter, or unwanted backfeeding of the battery.

SUMMARY

A vehicle power system may include a controller configured to issue commands to open a selected set of switches of an inverter in response to a fault associated with an electric drive system. The controller may issue commands to operate the selected set of switches according to a pulse width modulation signal having an increasing duty cycle such that input current to the inverter is driven towards zero to reduce a magnitude of d-axis current from the electric machine and backfeeding of the battery.

The duty cycle may increase at a rate greater than twice a fundamental period of output current of the inverter. The duty cycle may increase at a rate less than four times the fundamental period of the output current. The set of switches may be related to a three phase polarity of the electric machine. The frequency of the increasing duty cycle and a frequency of a drive signal for the traction inverter or electric machine may be same. The increasing duty cycle may be based on a ramp and sawtooth signal. The sawtooth signal and the drive signal may be same. The switches may be IGBT switches.

DETAILED DESCRIPTION

Figure 1:
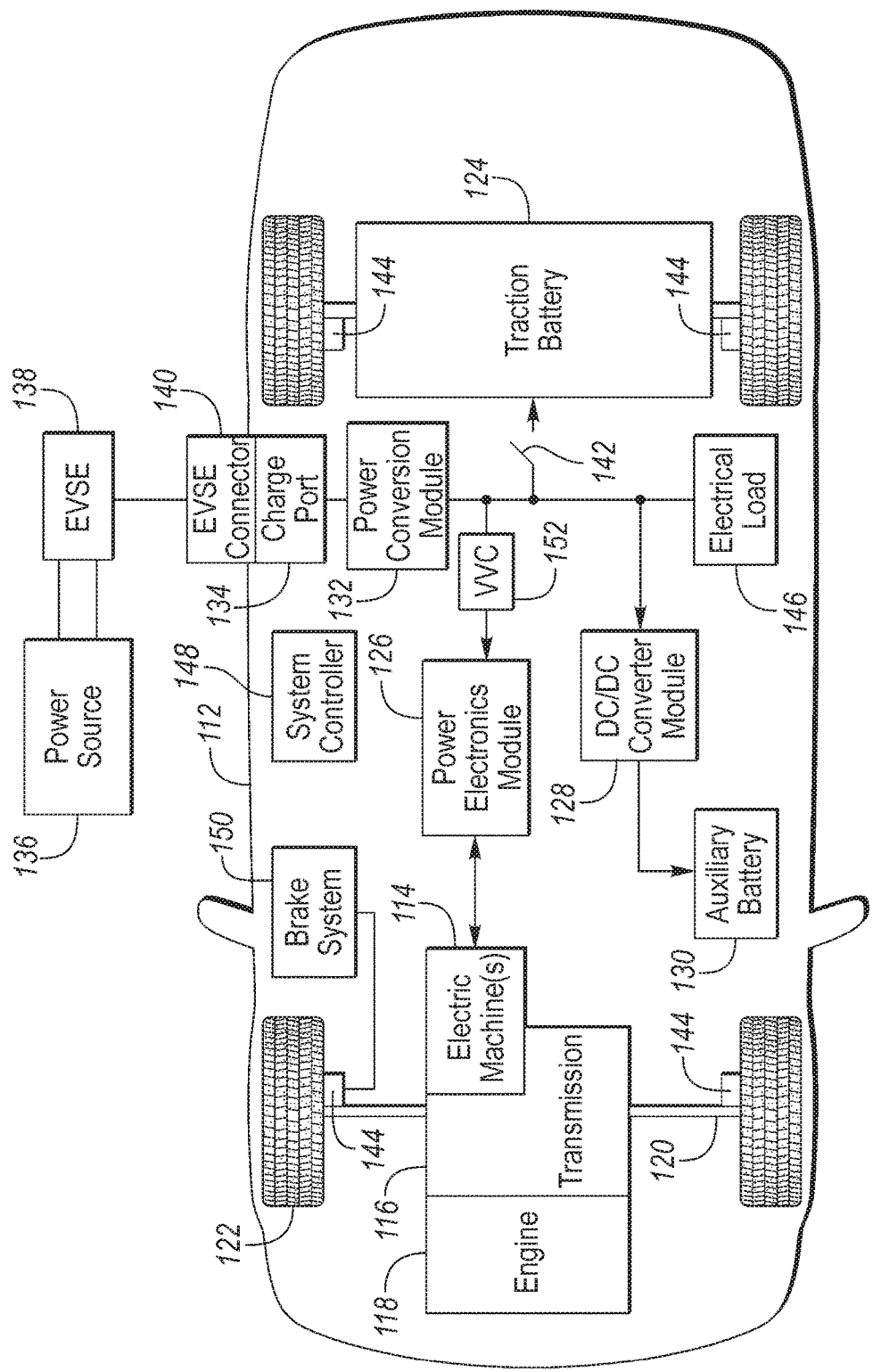
FIG. 1 is a plan view of a vehicle propulsion system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric and hybrid vehicles include permanent magnet traction motors to propel the vehicle. Permanent magnets are typically embedded around the rotor of an electric machine. Magnetic fields induced by the stator oppose magnetic fields of the rotor and are used to rotate the rotor relative to the stator. The stator has a core formed of electric steel or material having a high relative magnetic permeability. A plurality of slots is distributed along an inner diameter of the stator. Each being sized to receive conductors capable of carrying electric current. Conductors are wound around teeth formed by the slots to form windings. The windings may be arranged to support three distinct phases to improve the magnetic field produced. Vehicles create alternating current by inverting direct current. Direct current may be provided from batteries or capacitors.

Inverters can create alternating current in three phases to smooth the rotating magnetic field induced by the stator for improved performance. Three-phase inverters typically require six switches. These switches may be insulated-gate bipolar transistor (IGBT) switches. The switches are grouped into three sets, one for each phase. Each set has a positive and negative switch to generate the positive or negative portion of the alternating signal. The switches can, therefore, be referred to as either upper or lower switches because of the polarity of the signal each produces.

Sinusoidal alternating current is generated by the switches based on a pulse width modulation (PWM) signal. The PWM signal duty cycle emulates the magnitude of the desired sinusoidal signal. The switches are energized according to the PWM signal to convert direct current source (e.g., a battery) to alternating current, which is used to induce the magnetic field.

During use, the electric machine may encounter a fault and require safe shutdown of the machine for a variety of reasons. A stator fault may cause an open or short circuit on one of the stator windings. Vibrations or disturbances may cause stator/rotor airgap irregularities. Bearing or gearbox failures may result in a required safe shutdown of the machine. A fault, short, or transient all require safe shutdown of the machine. Other faults may include, a loss of sensors, connector loose contacts, resolver fault, software fault, or hardware fault. A controller may be configured to safely shutdown the machine. Because electric machines do not typically have traditional brakes, one issue with the shutdown of an electric machine is backfeeding of the inverter or battery. When a fault is detected, the controller may close a set of the inverter switches to connect power to the electric machine. This protection strategy prevents backfeeding but, consequently, causes a large negative d-axis current on the three-phase machine. Large, negative d-axis currents can demagnetize the permanent magnets of the rotor.

Instead of close a set of the switches, another protection strategy may open all of the switches. Opening all of the switches reduces the magnitude of the negative d-axis current. This open configuration, however, causes the electric machine to act as a charger for the battery because current from the electric machine flows through the diodes of the inverter. In certain circumstances the battery may be unable to receive this charging current. For example, the battery may have a high state of charge.

Instead of opening all switches or shorting a set of switches, the controller may open all of the switches as soon as a fault condition is detected. The controller may gradually increase the duty cycle such that all of the switches reach a complementary 50% duty cycle. Meaning, the upper and lower switches cooperate to reach a fully shorted state. This control scheme, however, requires all of the switches to be used, and cross-conduction of the upper and lower switches is required to be limited by adjusting the deadtime of the PWM signal. The use of all switches may cause malfunctioning of the system if one of the switches is inoperable and requires additional calculations to determine the deadtime.

In order to overcome the use of all switches a simpler control scheme may be implemented. For example only the upper or lower switches may be progressively driven closed by adjusting the ramp signal. The upper or lower switches generate the positive and negative sections of the alternating signal, respectively. Opening all of the switches requires all of the switches to operate correctly. The control system may be altered to only open upper or lower switches based on a received signal indicating switch malfunction. This combination of some of the switches is actuated via the PWM signal and ramped such that the current generated by the machine and received by the battery reaches zero. A combination of switches may be used to limit the negative d-axis current and reduce negative current received by the batteries. The controller may be configured to monitor the gate drivers to recognize malfunction of the IGBT switches. The switches may also be other types of field effect or bipolar junction transistors.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150.

The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
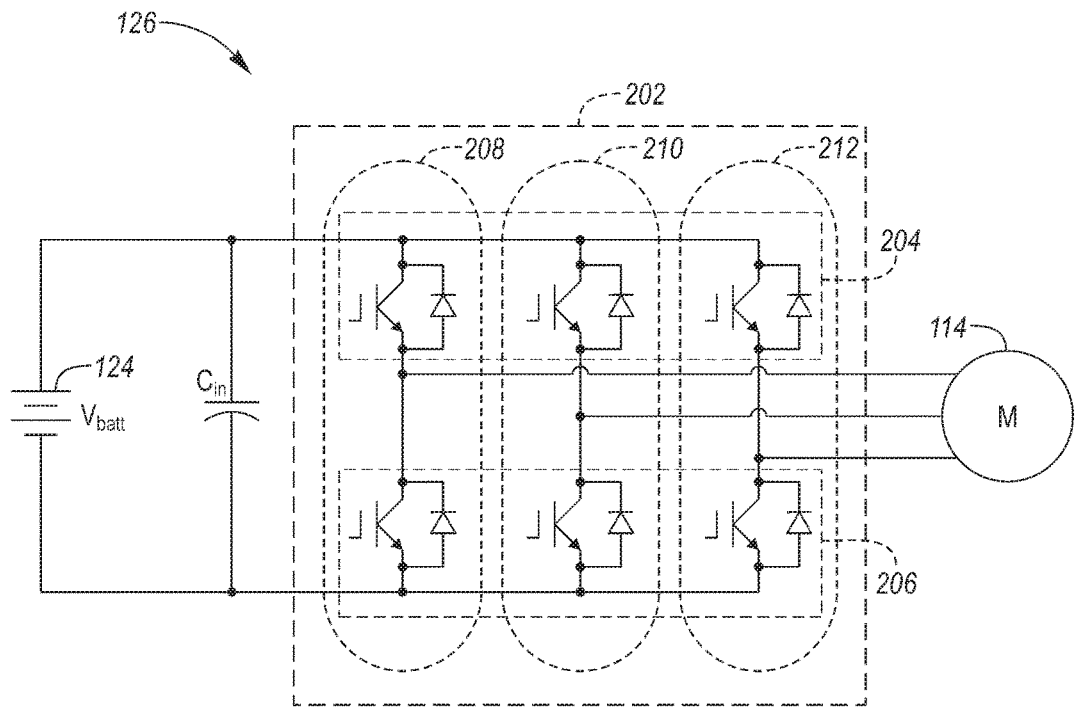
FIG. 2 is a plan view of an inverter for an electric machine of a vehicle.

Now referring to FIG. 2, a power electronics module 126 is shown having a DC source $V_{batt}$ 124 powering an electric machine, M, 114. An inverter circuit 202 is shown having a plurality of IGBT or other switches used to generate an alternating signal for the motor. As shown, the inverter has a set of upper switches 204 and lower switches 206. The switches are split into phase groups 208, 210, 212. Phase A is associated with switch set 208; Phase B with switch set 210; and Phase C with switch set 212. Each of the upper switches 204 provides a positive polarity for its relative phase. Each of the lower switches 206 provides a negative polarity for its relative phase. Each one of the switches is coupled with an anti-parallel diode to conduct reverse current when necessary. A controller controls each of the switches using a PWM signal to create a three-phase sinusoidal current for the stator windings. Although shown as a three-phase system, this disclosure contemplates machines operated on less or more than three phases.

Figure 3:
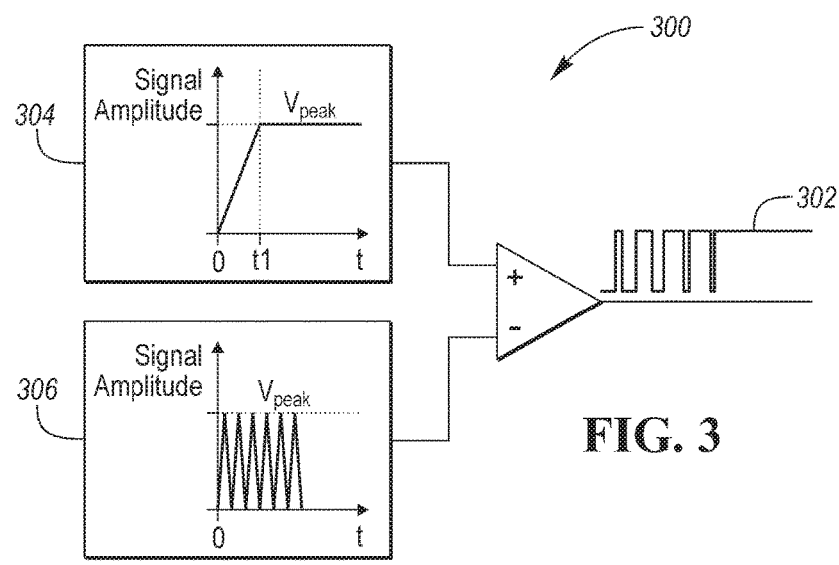
FIG. 3 is a ramp signal in combination with a sawtooth signal to form a ramped pulse width modulation signal.

Now referring to FIG. 3, a method 300 of generating a PWM signal 302 having an increasing duty cycle is shown. A ramp signal 304 is combined with a triangle or sawtooth signal 306 to create a PWM signal having an increasing duty cycle. The duty cycle may be increased at a ramp rate of three times, preferably, the inverter output current fundamental period. The ramp duration may also be between a range of two and four times the inverter output current fundamental period. The ramp duration may be closer to four times the inverter output current fundamental period the close the electric machine is to maximum rotations per minute. If the ramp period duration is too low, the negative d-axis current will have more overshoot, which is undesirable. If the ramp period duration is too high, the motor will operate as a generator for an extended period, which is undesirable. The ramp and resulting pulse width modulation signal can be implemented in either hardware or software. For example, the software in the controller may be configured to output the proper PWM signal. The software in the controller may use the same sawtooth signal as is used to generate the three-phase sinusoidal signals.

The simplicity of the protection scheme allows for a hardware implementation of the entire system. The ramp and sawtooth signal may be integrated circuits initiated by trip relays. In order to cover all motor speeds, the lowest motor speed may be used for the ramp rate. Additional ramp rates may be used as the motor speed passes through particular thresholds. For example, once the motor has reached a speed of 1500 rotations per minute, the ramp rate may be set at three times the rotor speed.

Figure 4:
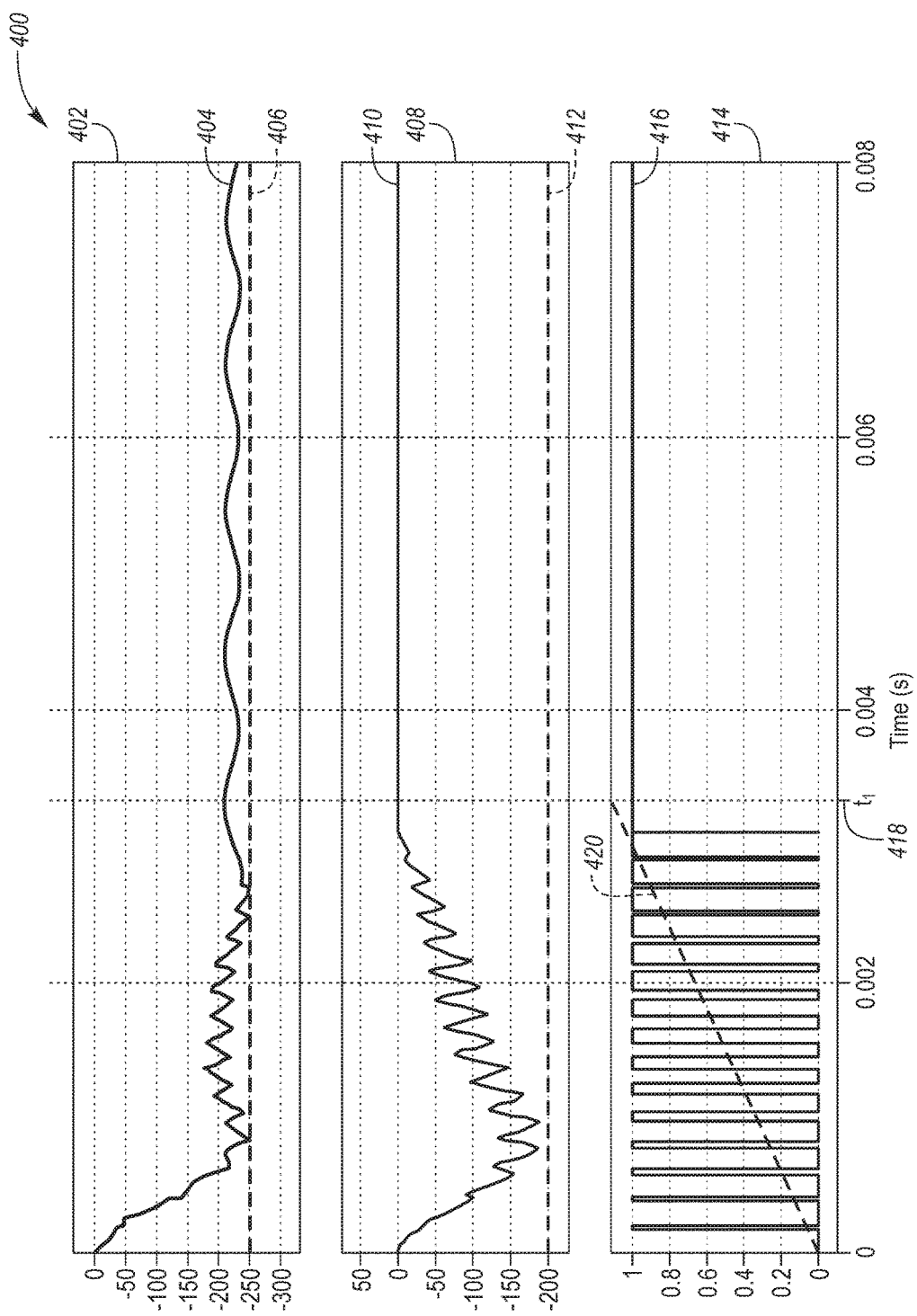
FIG. 4 is a graph depicting the output of probes of particular components during a motor transient.

Now referring to FIG. 4, a graph 400 showing at least one expected response after application of the methods disclosed. Chart 402 includes an electric machine probe indicating d-axis current 404 shows the expected negative current after a trip, fault, or short. The d-axis current 404 maintains a level above line 406, which indicates the maximum negative d-axis current is −250 A. Chart 408 includes a an electric machine probe indicating battery input current 410 during the same trip event. The maximum charging period is only three milliseconds. The battery input current 410 does not fall below the current line 412. Chart 414 includes an electric machine probe of the control signal sent to one set of switches, positive or negative, including a ramped PWM signal 416. The ramp begins at $t_0$ and ends at $t_1$ 418.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
    a controller configured to, in response to a fault with an electric drive system, issue commands to open a selected set of switches of an inverter, such that the selected set has a same phase and unselected switches have a different phase than the selected set, and operate the selected set of switches according to a pulse width modulation signal having an increasing duty cycle.
2. The vehicle power system of claim 1, wherein the duty cycle increases for a duration greater than twice a fundamental period of output current of the inverter.

3. The system of claim 2, wherein the duty cycle increases for a duration less than four times the fundamental period of the output current.

4. The system of claim 1, wherein a frequency of the increasing duty cycle matches a frequency of a drive signal for the electric drive system.

5. The system of claim 4, wherein the increasing duty cycle is based on a ramp and sawtooth signal.

6. The system of claim 5, wherein the sawtooth signal and the drive signal are the same signal.

7. The system of claim 1, wherein the selected set of switches are IGBT switches.

8. A method comprising:
by controller, responsive to receiving indication of a fault with an electric drive,
opening a selected set of a plurality of switches of an inverter, such that the selected set has a same polarity and unselected switches of the plurality have a same polarity opposite the selected set, and
operating the selected set according to a pulse width modulation signal having an increasing duty cycle to reduce d-axis current.

9. The method of claim 8, wherein the duty cycle increases for a duration greater than twice a fundamental period of output current of the inverter.

10. The method of claim 9, wherein the duty cycle increases for a duration less than four times the fundamental period of the output current.

11. The method of claim 8, wherein a frequency of the increasing duty cycle matches a frequency of a drive signal for the electric drive system.

12. The method of claim 11, wherein the increasing duty cycle is based on a ramp and sawtooth signal.

13. The method of claim 12, wherein the sawtooth signal and the drive signal are the same signal.

14. The method of claim 8, wherein the selected set of switches are IGBT switches.

15. A vehicle power system comprising:
a battery;
an inverter; and
a controller configured to, responsive to an electric drive fault,
drive an input battery current towards zero and reduce an d-axis current magnitude by opening a selected set of IGBTs of the inverter, such that the selected set has a same polarity and unselected IGBTs of the plurality have a same polarity opposite the selected set, and
operate the selected set according to a pulse width modulation signal having a duty cycle that increases.

16. The vehicle power system of claim 15, wherein a frequency of the duty cycle matches a frequency of a drive signal for the electric drive system.

* * * * *